US007623542B2

(12) United States Patent
Yonge, III et al.

(10) Patent No.: US 7,623,542 B2
(45) Date of Patent: *Nov. 24, 2009

(54) CONTENTION-FREE ACCESS INTERVALS ON A CSMA NETWORK

(75) Inventors: Lawrence W. Yonge, III, Ocala, FL (US); Srinivas Katar, Ocala, FL (US); Stanley J. Kostoff, II, Ocala, FL (US); William E. Earnshaw, Ocala, FL (US)

(73) Assignee: Intellon Corporation, Ocala, FL (US)

( * ) Notice: Subject to any disclaimer, the term of this patent is extended or adjusted under 35 U.S.C. 154(b) by 892 days.

This patent is subject to a terminal disclaimer.

(21) Appl. No.: 10/695,371

(22) Filed: Oct. 21, 2003

(65) Prior Publication Data

US 2004/0136396 A1 Jul. 15, 2004

Related U.S. Application Data

(60) Provisional application No. 60/504,733, filed on Sep. 18, 2003, provisional application No. 60/420,071, filed on Oct. 21, 2002.

(51) Int. Cl.
*H04L 12/413* (2006.01)
(52) U.S. Cl. .................................. 370/445; 370/462
(58) Field of Classification Search .................. 370/445, 370/465, 431
See application file for complete search history.

(56) References Cited

U.S. PATENT DOCUMENTS

| | | | |
|---|---|---|---|
| 3,806,885 A | 4/1974 | Moore | |
| 4,569,044 A | 2/1986 | Tao et al. | |
| 4,581,734 A | 4/1986 | Olson et al. | |
| 4,630,261 A | 12/1986 | Irvin | |
| 4,677,612 A | 6/1987 | Olson et al. | |
| 4,682,324 A | 7/1987 | Ulug | |
| 4,720,850 A | 1/1988 | Oberlander et al. | |
| 4,726,018 A | 2/1988 | Bux et al. | |
| 4,792,947 A | 12/1988 | Takiyasu et al. | |
| 4,819,229 A | 4/1989 | Pritty et al. | |
| 4,881,241 A | 11/1989 | Pommier et al. | |
| 4,943,959 A | 7/1990 | Arnold | |
| 5,001,472 A | 3/1991 | Fischer et al. | |

(Continued)

FOREIGN PATENT DOCUMENTS

DE 3413144 10/1985

(Continued)

OTHER PUBLICATIONS

Kamerman, A; Aben, G; Net throughput with IEEE 802.11 wireless LANs; Wireless Communications and Networking Conference, 2000. WCNC 2000 IEEE, vol. 2, Sep. 23-28, 2000; pp. 747-752.

(Continued)

*Primary Examiner*—Phuc H Tran
(74) *Attorney, Agent, or Firm*—Fish & Richardson P.C.

(57) ABSTRACT

A method of operating in a network in which stations communicate over a shared medium is described. The method provides regularly repeated contention free intervals, CSMA communication during times outside the contention free intervals, and distributed control over the initiation and makeup of the contention free intervals to a plurality of stations so that any of the plurality of stations can independently initiate transmission within the contention free interval.

60 Claims, 4 Drawing Sheets

U.S. PATENT DOCUMENTS

| | | | |
|---|---|---|---|
| 5,003,539 A | 3/1991 | Takemoto et al. |
| 5,046,069 A | 9/1991 | Calvignac et al. |
| 5,081,678 A | 1/1992 | Kaufman et al. |
| 5,105,423 A | 4/1992 | Tanaka et al. |
| 5,121,396 A | 6/1992 | Irvin et al. |
| 5,140,584 A | 8/1992 | Suzuki |
| 5,157,659 A | 10/1992 | Schenkel |
| 5,197,061 A | 3/1993 | Halbert-Lassalle et al. |
| 5,214,646 A | 5/1993 | Yacoby |
| 5,228,025 A | 7/1993 | Le Floch et al. |
| 5,231,634 A | 7/1993 | Giles et al. |
| 5,274,629 A | 12/1993 | Helard et al. |
| 5,280,480 A | 1/1994 | Pitt et al. |
| 5,307,376 A | 4/1994 | Castelain et al. |
| 5,339,313 A | 8/1994 | Ben-Michael et al. |
| 5,343,473 A | 8/1994 | Cidon et al. |
| 5,384,777 A | 1/1995 | Ahmadi et al. |
| 5,416,801 A | 5/1995 | Chouly et al. |
| 5,426,646 A | 6/1995 | Slack |
| RE35,001 E | 7/1995 | Grow |
| 5,432,848 A | 7/1995 | Butter et al. |
| 5,436,905 A | 7/1995 | Li et al. |
| 5,448,565 A | 9/1995 | Chang et al. |
| 5,452,288 A | 9/1995 | Rahuel et al. |
| 5,452,322 A | 9/1995 | Lauer |
| 5,473,602 A | 12/1995 | McKenna et al. |
| 5,481,535 A | 1/1996 | Hershey |
| 5,483,529 A | 1/1996 | Baggen et al. |
| 5,488,632 A | 1/1996 | Mason et al. |
| 5,504,747 A | 4/1996 | Sweazey |
| 5,515,379 A | 5/1996 | Crisler et al. |
| 5,524,027 A | 6/1996 | Huisken |
| 5,537,414 A | 7/1996 | Takiyasu et al. |
| 5,541,922 A | 7/1996 | Pyhalammi |
| 5,548,649 A | 8/1996 | Jacobson |
| 5,555,268 A | 9/1996 | Fattouche et al. |
| 5,563,883 A | 10/1996 | Cheng |
| 5,563,897 A | 10/1996 | Pyndiah et al. |
| 5,568,476 A | 10/1996 | Sherer et al. |
| 5,610,908 A | 3/1997 | Shelswell et al. |
| 5,612,975 A | 3/1997 | Becker et al. |
| 5,615,212 A | 3/1997 | Ruszczyk et al. |
| 5,619,651 A | 4/1997 | Young |
| 5,623,512 A | 4/1997 | Sasaki |
| 5,629,942 A | 5/1997 | Zijderhand |
| 5,629,948 A | 5/1997 | Hagiwara et al. |
| 5,636,230 A | 6/1997 | Marturano et al. |
| 5,644,576 A | 7/1997 | Bauchot et al. |
| 5,651,009 A | 7/1997 | Perreault et al. |
| 5,694,389 A | 12/1997 | Seki et al. |
| 5,706,348 A | 1/1998 | Gray et al. |
| 5,717,689 A | 2/1998 | Ayanoglu |
| 5,732,113 A | 3/1998 | Schmidl et al. |
| 5,737,330 A | 4/1998 | Fulthorp et al. |
| 5,745,769 A | 4/1998 | Choi |
| 5,757,766 A | 5/1998 | Sugita |
| 5,757,770 A | 5/1998 | Lagoutte et al. |
| 5,764,931 A | 6/1998 | Schmahl et al. |
| 5,771,235 A | 6/1998 | Tang et al. |
| 5,787,071 A | 7/1998 | Basso et al. |
| 5,790,541 A | 8/1998 | Patrick et al. |
| 5,793,307 A | 8/1998 | Perreault et al. |
| 5,793,861 A * | 8/1998 | Haigh ......................... 257/693 |
| 5,799,033 A | 8/1998 | Baggen |
| 5,812,599 A | 9/1998 | Van Kerckhove |
| 5,818,821 A | 10/1998 | Schurig |
| 5,818,826 A | 10/1998 | Gfeller et al. |
| 5,825,807 A | 10/1998 | Kumar |
| 5,828,677 A | 10/1998 | Sayeed et al. |
| 5,841,778 A | 11/1998 | Shaffer et al. |
| 5,841,873 A | 11/1998 | Lockhart et al. |
| 5,884,040 A | 3/1999 | Chung |
| 5,886,993 A | 3/1999 | Ruszczyk et al. |
| 5,892,769 A | 4/1999 | Lee |
| 5,896,561 A | 4/1999 | Schrader et al. |
| 5,903,614 A | 5/1999 | Suzuki et al. |
| 5,914,932 A | 6/1999 | Suzuki et al. |
| 5,914,959 A | 6/1999 | Marchetto et al. |
| 5,940,399 A | 8/1999 | Weizman |
| 5,940,438 A | 8/1999 | Poon et al. |
| 5,948,060 A | 9/1999 | Gregg et al. |
| 5,956,338 A | 9/1999 | Ghaibeh |
| 5,966,412 A | 10/1999 | Ramaswamy |
| 5,970,062 A | 10/1999 | Bauchot |
| 5,987,011 A | 11/1999 | Toh |
| 6,005,894 A | 12/1999 | Kumar |
| 6,006,017 A | 12/1999 | Joshi et al. |
| 6,041,063 A | 3/2000 | Povlsen et al. |
| 6,041,358 A | 3/2000 | Huang et al. |
| 6,044,154 A | 3/2000 | Kelly |
| 6,044,482 A | 3/2000 | Wong |
| 6,052,377 A | 4/2000 | Ohmi et al. |
| 6,074,086 A | 6/2000 | Yonge, III |
| 6,076,115 A | 6/2000 | Sambamurthy et al. |
| 6,092,214 A | 7/2000 | Quoc et al. |
| 6,097,703 A | 8/2000 | Larsen et al. |
| 6,098,179 A | 8/2000 | Harter, Jr. |
| 6,108,713 A | 8/2000 | Sambamurthy et al. |
| 6,111,919 A | 8/2000 | Yonge, III |
| 6,125,150 A | 9/2000 | Wesel et al. |
| 6,130,887 A | 10/2000 | Dutta |
| 6,130,894 A | 10/2000 | Ojard et al. |
| 6,151,296 A | 11/2000 | Vijayan et al. |
| 6,169,744 B1 | 1/2001 | Grabelsky et al. |
| 6,182,147 B1 | 1/2001 | Farinacci |
| 6,188,717 B1 | 2/2001 | Kaiser et al. |
| 6,192,397 B1 | 2/2001 | Thompson |
| 6,202,082 B1 | 3/2001 | Tomizawa et al. |
| 6,215,792 B1 | 4/2001 | Abi-Nassif |
| 6,216,244 B1 | 4/2001 | Myers et al. |
| 6,222,851 B1 | 4/2001 | Petry |
| 6,243,386 B1 | 6/2001 | Chan et al. |
| 6,243,449 B1 | 6/2001 | Margulis et al. |
| 6,246,770 B1 | 6/2001 | Stratton et al. |
| 6,252,849 B1 | 6/2001 | Rom et al. |
| 6,259,696 B1 | 7/2001 | Yazaki et al. |
| 6,263,445 B1 | 7/2001 | Blumenau |
| 6,269,132 B1 | 7/2001 | Yonge, III |
| 6,278,685 B1 | 8/2001 | Yonge, III et al. |
| 6,278,716 B1 | 8/2001 | Rubenstein et al. |
| 6,279,716 B1 | 8/2001 | Kayatani et al. |
| 6,289,000 B1 | 9/2001 | Yonge, III |
| 6,295,296 B1 | 9/2001 | Tappan |
| 6,334,185 B1 | 12/2001 | Hansson et al. |
| 6,343,083 B1 | 1/2002 | Mendelson et al. |
| 6,363,052 B1 | 3/2002 | Hosein |
| 6,370,156 B2 | 4/2002 | Spruyt et al. |
| 6,385,672 B1 | 5/2002 | Wang et al. |
| 6,397,368 B1 | 5/2002 | Yonge, III et al. |
| 6,421,725 B1 | 7/2002 | Vermilyea et al. |
| 6,430,192 B1 | 8/2002 | Creedon et al. |
| 6,430,661 B1 | 8/2002 | Larson et al. |
| 6,434,153 B1 | 8/2002 | Yazaki et al. |
| 6,442,129 B1 | 8/2002 | Yonge, III et al. |
| 6,456,649 B1 | 9/2002 | Isaksson et al. |
| 6,466,580 B1 | 10/2002 | Leung |
| 6,469,992 B1 | 10/2002 | Schieder |
| 6,473,435 B1 | 10/2002 | Zhou et al. |
| 6,480,489 B1 | 11/2002 | Muller et al. |
| 6,487,212 B1 | 11/2002 | Erimli et al. |
| 6,501,760 B1 | 12/2002 | Ohba et al. |
| 6,519,263 B1 | 2/2003 | Huth |
| 6,526,451 B2 | 2/2003 | Kasper |
| 6,538,985 B1 | 3/2003 | Petry et al. |

| | | | |
|---|---|---|---|
| 6,553,534 | B2 | 4/2003 | Yonge, III et al. |
| 6,567,416 | B1 | 5/2003 | Chuah |
| 6,567,914 | B1 | 5/2003 | Just et al. |
| 6,654,410 | B2 | 11/2003 | Tzannes |
| 6,667,991 | B1 | 12/2003 | Tzannes |
| 6,671,284 | B1 | 12/2003 | Yonge, III et al. |
| 6,747,976 | B1 | 6/2004 | Bensaou et al. |
| 6,778,507 | B1 | 8/2004 | Jalali |
| 6,907,044 | B1 * | 6/2005 | Yonge et al. ............... 370/445 |
| 6,909,723 | B1 * | 6/2005 | Yonge et al. ............... 370/447 |
| 7,280,517 | B2 * | 10/2007 | Benveniste .................. 370/338 |
| 7,369,579 | B2 | 5/2008 | Logvinov et al. |
| 2001/0043576 | A1 | 11/2001 | Terry |
| 2001/0048692 | A1 | 12/2001 | Karner |
| 2002/0012320 | A1 | 1/2002 | Ogier et al. |
| 2002/0042836 | A1 | 4/2002 | Mallory |
| 2002/0048368 | A1 | 4/2002 | Gardner |
| 2002/0061031 | A1 * | 5/2002 | Sugar et al. ................ 370/466 |
| 2002/0065047 | A1 | 5/2002 | Moose |
| 2002/0115458 | A1 * | 8/2002 | Mizuno et al. ............. 455/507 |
| 2002/0137462 | A1 | 9/2002 | Rankin |
| 2002/0191533 | A1 | 12/2002 | Chini et al. |
| 2003/0006883 | A1 | 1/2003 | Kim et al. |
| 2003/0079169 | A1 | 4/2003 | Ho et al. |
| 2003/0174664 | A1 | 9/2003 | Benveniste |
| 2003/0181204 | A1 | 9/2003 | Benveniste |
| 2003/0217182 | A1 | 11/2003 | Liu et al. |
| 2004/0001499 | A1 | 1/2004 | Patella et al. |
| 2004/0064509 | A1 | 4/2004 | Ayyagari et al. |
| 2004/0136396 | A1 | 7/2004 | Yonge et al. |
| 2005/0190785 | A1 | 9/2005 | Yonge, III et al. |
| 2005/0192011 | A1 * | 9/2005 | Hong et al. ................ 455/440 |
| 2007/0025383 | A1 | 2/2007 | Katar et al. |

FOREIGN PATENT DOCUMENTS

| | | |
|---|---|---|
| EP | 0818905 | 1/1998 |
| WO | 98/57440 | 12/1998 |
| WO | WO00/72495 | 11/2000 |
| WO | 02/41598 | 5/2002 |
| WO | WO 2003/100996 | 12/2003 |
| WO | WO 2004/038980 | 5/2004 |

OTHER PUBLICATIONS

Dube, P.; Altman, E.; Queueing analysis of early message discard policy; Communications, 2002. ICC 2002. IEEE International Conference, vol. 4, Iss., 2002, pp. 2426-2430.
U.S. Appl. No. 09/632,303.
Sun et al., Public-key ID-based Cryptosystem, 1991, IEEE, pp. 142-144.
Bruschi, Danilo, Secure Multicast in Wireless Networks of Mobile Hosts: Protocols and Issues, 2002, Mobile Networks and Applications, pp. 503-511.
IBM, Combined use of collision resolution and collision avoidance MAC protocols, Oct. 1, 1994, IBM Technical Disclosure Bulletin, vol. 37, pp. 299-302 (NN9410299).
ISO/IEC 8802-3: 2002 International Standard (ANSI/IEEE Std 802. 3) Carrier sense multiple access with collision detection (CSMA/CD) access method and physical layer specifications.
ISO/IEC 8802-11: 1999 International Standard (ANSI/IEEE Std 802.11) Wireless LAN Medium Access Control (MAC) and Physical Layer (PHY) specifications.
Shared Wireless Access Protocol (Cordless Access) Specification, SWAP-CA Revision 1.21, Jan. 27, 1999, by the HomeRF™ Technical Committee.
Interface Specification for HomePNA™ 2.0—10M8 Technology, Dec. 1, 1999.
Interface Specification for HomePNA™ 2.0—10M8 Technology—Link Layer Protocols, Dec. 1, 1999.
Bux, "Token-Ring Local-Area Networks and Their Performance," Procs. Of the IEEE, vol. 77, No. 2, Feb. 1989.
Applied Cryptography, Second Edition: protocols, algorithms, and source code in C, Bruce Schneier, 1996.
PKCS #5 v. 20: Password-Based Cryptography Standard, RSA Laboratories, Mar. 25, 1999.
HomePlug Powerline Alliance, HomePlug 1.0.1 Specification, Dec. 1, 2001.
Lee et al., "HomePlug 1.0 powerline communication LANs—protocol description and performance results", Int. J. Commun. Syst., vol. 16 (2003).
Carrier sense multiple access with collision detection (CSMA/CD) access method and physical layer specifications, ISO/IEC 8802-3: 1996 International Standard (ANSI/IEEE Std 802.3).
Bertsekas et al., Data Networks, Prentice Hall, Englewood Cliffs, NJ, Section 2.4.3 Selective Repeat ARQ (1992).
HiPerformance Radio Local Area Network (HiperLAN) Type I: Functional Specification, European Standard (Telecommunication Series) No. 300652 V. 1.2.1 Jul. 1998.
An Architecture for Differentiated Services, IETF RFC 2475, Dec. 1998.
Goalic et al., "Real-Time Turbo-Decoding of Product Codes on a Digital Signal Processor," IEEE, pp. 624-628 (1997).
Benedetto et al., "A Soft-Input Soft-Output Maximum A Posteriori (MAP) Module to Decode Parallel and Serial Concatenated Codes," TDA Progress Report 42-127, pp. 1-20 (Nov. 1996).
Peterson et al., "Error-Correcting Codes," The MIT Press (1972).
Pyndiah, "Near-Optimum Decoding of Product Codes: Block Turbo Codes," IEEE Transactions on Communications, vol. 46, No. 8, pp. 1003-1010 (Aug. 1998).
Pyndiah, "Near Optimum Decoding of Product Codes," IEEE, pp. 339-343 (1994).
Pyndiah, "Performance of Block Turbo Coded 16-QAM and 64-QAM Modulations," IEEE, pp. 1039-1043 (1995).
Ehrsam et al., "A cryptographic key management scheme for implementing the Data Encryption Standard," IBM Syst J, vol. 17, No. 2 (1978).
European Search Report, European Patent Office, European Patent Application No. 06253916.8 — 1246, Oct. 31, 2006, 8 pages.
HomePlug Power Alliance Inc., "HomePlug AV White Paper," Doc ver. No. HPAVWP-050818, Aug. 2005, pp. 1-11.
International Search Report from PCT application No. PCT/US06/29377, dated Sep. 25, 2007, 9 pages.
Katar et al., "Beacon Schedule Persistence to Mitigate Beacon Loss in HomePlug AV Networks," May 2006, IEEE 1-4244-0113-May 2006, pp. 184-188.

* cited by examiner

CONTENTION-FREE ACCESS INTERVALS ON A CSMA NETWORK

CROSS REFERENCE TO RELATED APPLICATIONS

This application claims priority to U.S. Provisional Application No. 60/420,071, filed Oct. 21, 2002, and U.S. Provisional Application No. 60/504,733, filed Sep. 18, 2003.

TECHNICAL FIELD

This invention relates to network protocols, and more particularly to contention-free intervals on a carrier sense multiple access (CSMA) network.

BACKGROUND

Various protocols are known for sharing access to a medium, e.g., polling, time division multiple access (TDMA), token passing, and carrier sense multiple access (CSMA). Polling uses a master station to periodically poll other stations (slave stations), giving the slave stations explicit permission to transmit on the medium. TDMA protocols also rely on a master station (network master), which broadcasts a frame synchronization signal before each round of messages to synchronize the clocks of all stations, and, after synchronization occurs, each station transmits during its uniquely allocated time slice. In token passing, access to the transmission medium is determined by possession of a special data unit called a token, which is passed from station to station. CSMA protocols rely on all stations listening to the medium prior to transmission to determine when the medium is idle. After the transmission ends, each station waits a specified interval (also known as an interframe gap) followed by an additional delay of one or more transmission (contention resolution) slots based on an assigned slot number before transmitting.

Carrier sense multiple access (CSMA) protocols because of their simplified access mechanism and robustness in performance under a variety of network conditions are widely used. Multimedia applications require guarantees on such parameters as latency, jitter and packet loss probability. The uncontrolled nature of channel access in CSMA networks makes it difficult to support quality of service (QoS). QoS can be evaluated in terms of latency, jitter, and packet loss probability (PLP) where latency is how much time it takes for a packet of data to get from one device to another, jitter is a random variation in the delay between the arrival of one packet of data and a consecutive packet of data, and PLP is a probability of losing a packet of data transmitted from one device to another device. Several variations to the CSMA mechanism are in use that enable various degrees of control on the QoS parameters. For example, CSMA in the HomePlug® 1.0 protocol, available from Intellon Corp of Ocala, Fla., uses a priority resolution slot mechanism. HomePlug® 1.0 protocol uses four priority levels to classify transmissions on networks. Each transmission is thus classified depending on its QoS requirements. Each class embodies a coherent set of latency, jitter and packet loss probability (PLP) guarantees. Stations having transmissions at various priority levels waiting to be sent contend during priority resolution slots of time between transmissions, causing transmissions with priority that is lower than the highest available priority in the network to defer. Thus, stations having transmissions with highest priority in the network are guaranteed access to the medium before stations having transmissions with lower priority. However, stations having transmissions with the highest priority in the network still contend within themselves for medium access, thus reducing the level of guarantees on QoS parameters. Stations at the same priority level contending for access to the medium enter a "contention window" where the stations randomly select their transmission slot time.

In some network environments, e.g., power line network environments, CSMA protocol operation may be adversely effected by distance between stations and/or channel conditions. Also, CSMA protocols may be susceptible to interference (e.g., collision) caused by overlapping networks, that is, networks that are not intended to communicate with one another but that can, in fact, hear each other's transmission, as well as by hidden stations. A hidden station is a station in a network (or overlapped network) that cannot hear all other stations because of its location and/or channel conditions. Under such conditions, a CSMA protocol may not function effectively to maintain proper network synchronization and provide orderly media access arbitration. And a CSMA protocol may be unable to ensure strict adherence to QoS guarantees. For example, U.S. application Ser. No. 09/632,609 describes a system in which a single contention-free interval can be established on a CSMA network without the use of a master, but this method may be insufficient to handle strict quality of service (QoS) requirements or hidden nodes.

SUMMARY

In one aspect, the invention features a method of operating in a network in which a plurality of stations communicate over a shared medium, including using a carrier sense multiple access (CSMA) service for ordinary communication between the plurality of stations, having a first station that desires to establish a first session of regularly repeated (e.g., periodic) contention-free transmission intervals broadcast information descriptive of the first session to the other stations, wherein the first station can be any of the plurality of stations, and having other stations that receive the broadcast from the first station defer from transmitting during the contention-free intervals of the first session.

Implementations may include one or more of the following features. Distributing control over initiation and makeup of transmissions within the contention free intervals to a plurality of stations so that any of the plurality of stations can independently initiate a transmission within the contention free interval. Distributing control over the maintenance and termination of transmissions within the contention free interval to the plurality of stations so that any of the plurality of stations can independently terminate a transmission within the contention free interval. The plurality of stations may act as peers with respect to one another in initiating, maintaining, and terminating transmissions within the contention free interval. Not all stations on the network that receive the broadcast from the first station may defer from transmitting during the contention-free intervals; e.g., some stations may comprise legacy equipment (e.g., Home Plug 1.0) lacking the capability to defer.

In another aspect, the invention features a method of operating in a network in which stations communicate over a shared medium, including providing regularly repeated contention free intervals, providing CSMA communication during times outside the contention free intervals, and distributing control over the initiation and makeup of the contention free intervals to a plurality of stations so that any of the plurality of stations can independently initiate a transmission within the contention free interval.

Implementations may include one or more of the following features. Distributing control over the maintenance and termination of transmissions within the contention free interval to the plurality of stations so that any of the plurality of stations can independently terminate a transmission within the contention free interval. The plurality of stations may act as peers with respect to one another in initiating, maintaining, and terminating transmissions within the contention free interval.

Implementations may further include one or more of the following features. The regularly repeated contention free interval may be approximately periodic. The contention free interval may also support a plurality of transmissions, each using a different time segment within the contention free interval, so that a plurality of data streams can be transmitted using the contention free interval, with each data stream generally assigned to one of the different time segments. Any of the plurality of stations may further be capable of independently inserting a further transmission into the contention free interval. At least one data stream can be assigned to a plurality of different time segments spaced apart within the same contention free interval, thereby reducing latency for the at least one data stream. There can be two different time segments from the same contention free interval assigned to the same data stream, with one time segment at or near the start of the interval, and the other time segment at or near the midpoint of the interval.

Implementations may further include one or more of the following features. In some cases, each of the plurality of stations keeps track of the number of transmissions being supported by the contention free interval and the amount of time used by each of the transmissions, so that the station can make a determination whether the contention free interval has sufficient remaining capacity to support a further transmission by the station. Each of the stations sending a transmission during the contention free interval may begin transmitting in response to recognizing that the transmission immediately prior to it has concluded. A transmission that is concluding includes a hand-off indication near the end of its transmission, and the transmission that follows is initiated based on receipt of the hand-off indication and the identity of the transmission that is concluding. Each station may independently keep track of the usage of the contention free interval (e.g., by observation) to determine whether there is sufficient time available in the interval to support a further transmission that the station has been asked to initiate. Information characterizing each of the plurality of transmissions is conveyed to substantially all of the plurality of stations. The information characterizing a transmission can include information characterizing the temporal location of the transmission within the contention free interval.

Implementations may further include one or more of the following features. The information characterizing a particular transmission is conveyed to other stations not only by the station making the particular transmission but by other stations that receive the information and retransmit it to other stations, thereby increasing the likelihood that the information will be conveyed to all stations. Transmissions of different priority classes can share the contention free interval, and access to the contention free interval is given to a transmission of a higher priority class if insufficient time is available within the interval to support all transmissions seeking to use the interval. A transmission can be terminated if transmissions of higher priority consume enough of the contention free interval that insufficient time remains for continuing the transmission. Transmissions are terminated following a last-in, first-out protocol (e.g., last-in, first-out within each priority class).

A limit can be set on the fraction of time within the contention free interval that may be used by transmissions of a particular priority class. Different fractions of the contention free interval are assigned to different priority classes, so that some priority classes are allocated more of the contention free interval than other priority classes.

Implementations may further include one or more of the following features. The sequence of transmissions within the contention free interval is ordered by priority class, with transmissions of higher priority classes occurring earlier than transmissions of lower priority classes. The sequence of transmissions within the contention free interval is ordered by sequence in which transmission was initiated, with earlier initiated transmissions occurring earlier than later initiated transmissions. Short time intervals are provided between successive transmissions within the contention free interval, so that a station desiring to initiate a new transmission may begin the transmission during the short time interval, and other stations will learn that the new transmission has been inserted at that location in the contention free interval. A short time interval is provided following the last transmission of each priority class, so that a station desiring to initiate a new transmission with a particular priority class may begin the transmission during the short time interval following the last transmission of that priority class. A station desiring to initiate a transmission of a particular priority class will generally initiate the transmission between the last transmission of the same or higher priority class and the start of the first transmission of a lower priority class, thereby maintaining a priority order to the sequence of transmissions within the contention free interval. A short time interval is provided following the last transmission of each priority class, and the transmission of the particular priority class is initiated during the short time interval between the last transmission of the same or higher priority class and the start of the first transmission of a lower priority class.

Implementations may further include one or more of the following features. Each of the stations can independently follow a set of admission rules common to the plurality of stations. Each transmission is assigned a unique identifier, and the identifier is conveyed to the other stations along with information characterizing the transmission. The length of the contention free interval varies with demand for contention free transmissions. The shared medium may be an alternating current (AC) power line, and the contention-free intervals may be approximately synchronized to the power cycle. The contention free interval duration may be chosen so that at least some of the transmissions within the contention free interval occupy a different portion of the power cycle during successive contention free intervals. Alternatively, the contention free interval duration may be chosen so that the transmissions within the contention free interval are intentionally not synchronized to the line cycle so that each transmission generally occupies a different portion of the power line cycle during successive contention free intervals.

Implementations may further include one or more of the following features. The information descriptive of the first session may comprise the duration of the contention-free intervals. The information descriptive of the first session may comprise a period of the contention-free intervals. The information descriptive of the first session may comprise the time at which the first session will begin. The information descriptive of the first session may comprise the address or addresses of the station or stations that are the intended receivers of the data to be transmitted during the first session. The information descriptive of the first session may comprise the address of the station that is establishing the first session. A second session of regularly-repeated contention-free transmission intervals may be established by a second station, wherein the second station can be any of the plurality of stations, and wherein the method may further comprises having the second station determine the timing of the second session taking into account the information descriptive of the first session, having the second station broadcast information descriptive of the second session to the other stations, and having the other stations that receive the broadcast from the second station defer from transmitting during the contention-free intervals of the first and the second sessions. The method may further comprise having the first station transmit maintenance information during the first session. The maintenance information descriptive of the first session may include a revised duration for the contention-free intervals. The maintenance information descriptive of the first session may include the time at which the subsequent contention-free interval starts. The method may further comprise having the first station transmit termination information during the first session, the termination information including the time at which the first session will end. At least a portion of the information descriptive of the first session may be transmitted in one or more header fields of packets broadcast over the network. At least a portion of the information descriptive of the first session may be transmitted in the packet body of packets broadcast over the network. At least a portion of the information descriptive of the first session may be fixed ahead of time and not included in the information descriptive of the first session. The information descriptive of the first session may be broadcast using the CSMA service. The information descriptive of the first session may be broadcast using the regularly-repeated contention-free session. One or more stations other than the first station may propagate the session information generated by the first station.

This invention provides an integrated set of mechanisms to providing guaranteed QoS in CSMA networks in a highly distributed manner. Using this set of mechanisms, traffic streams requiring QoS obtain periodic access to the medium. Multiple traffic streams coordinate with each other in a distributed manner and align with respect to each other. Distributed admission control is used to prevent the network resources from being over allocated.

Regularly-repeated contention-free network channel access provides a distributed mechanism for guaranteeing QoS in CSMA networks while maintaining network efficiency. Regularly-repeated contention-free network channel access operates in networks with legacy equipment and has an ability to adapt to changing channel and network conditions. Video traffic can be transmitted on the same power line network as used for data. The higher throughput and higher quality of service (QoS) associated with TDMA can be provided on a CSMA network, without the complexity and difficulty of setting up one station as a master. By avoiding the use of a master/slave architecture, the communication system can function even in the presence of hidden stations.

The details of one or more embodiments of the invention are set forth in the accompanying drawings and the description below. Other features and advantages of the invention will be apparent from the description, drawings, and from the claims.

DETAILED DESCRIPTION

Figure 1:
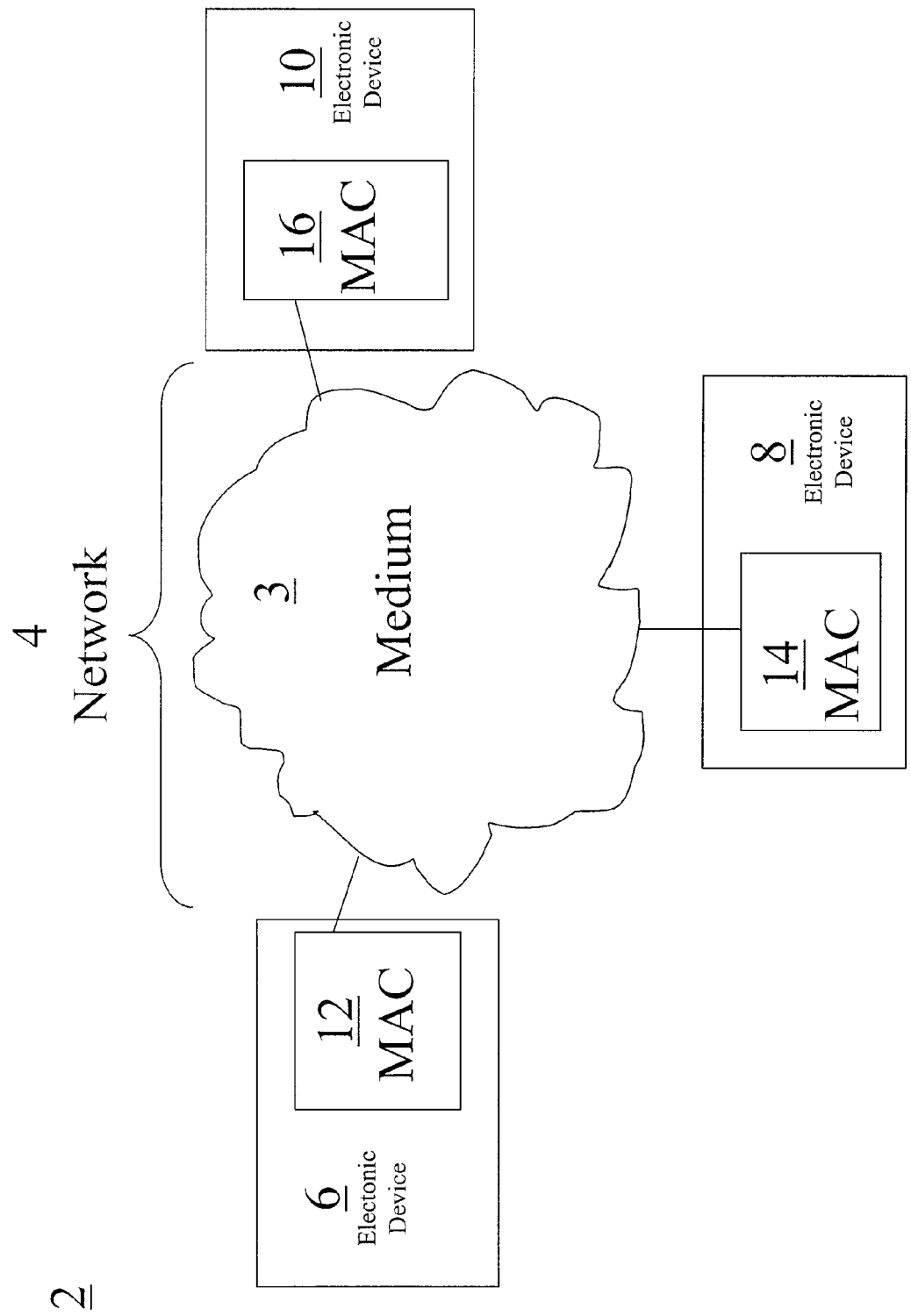
FIG. 1 is a network configuration.

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

A network configuration includes communications medium 3 and network 4 in which electronic devices 6, 8, and 10 (e.g., audiovisual equipment) communicate over medium 3. Electronic devices 6, 8, and 10 include media access controllers (MAC) 12, 14, and 16 that manage communication access to the network 4 for electronic devices 6, 8, and 10, respectively. MACs 12, 14, and 16 implement the data link layer and connect to the physical layer of the Open Systems Interconnection (OSI) network architecture standard. In a general sense, MACs 12, 14, and 16 represent stations on network 4 that send messages to one another over medium 3. Communications medium 3 is a physical communication link between electronic devices 6, 8, and 10 that includes optical fiber, coaxial cable, unshielded twisted pair, in addition to other media such as power lines. Electronic devices 6, 8, and 10 communicate with one another based on requirements of software applications running on electronic devices 6, 8, and 10. This communication creates traffic of messages on network 4.

1. Traffic Classes

Traffic of messages on network 4 is divided into eight priority classes depending on the QoS requirements of each message. Each priority class embodies a coherent set of latency, jitter and packet loss probability (PLP) guarantees, which translate into such parameters as access priority and number of message transmission retries at the MACs 12, 14, and 16. For network configuration 2, eight traffic classes are defined. Each of these priority classes embodies a set of Quality of Service (QoS) characteristics for an application and can be translated naturally to such behavior in the MACs 12, 14, and 16 as channel access and number of retries. The characteristics of these priority classes are defined such that each class can support a specific range of QoS parameters. The priority classes are such that 0 is the lowest priority and 7 is the highest priority. Table 1 shows the definition of each class and its associated QoS Parameters.

Transmissions from MACs 12, 14, and 16 with Priority Classes 0 to 3 use carrier sense multiple access/collision avoidance (CSMA/CA) protocols such as HomePlug® 1.0. Thus, MACs 12, 14, and 16 having transmissions at priority levels 0 to 3 waiting to be sent simply contend during priority resolution slots between transmissions, causing stations transmissions with priority that is lower that the highest available priority in the network to defer. Stations having transmissions with priority 3 in the network are guaranteed access to the medium before stations having transmissions with lower priorities 0-2. However, stations having transmissions with priority 3 in the network contend within themselves for medium access. Transmissions with priority classes 0 to 3 are intended for applications with low QoS requirements such as applications transferring files and applications managing MACs 12, 14, and 16. Such applications can be described to have aperiodic transmission requirements because their transmissions do not typically have to be sent on a regular periodic basis. MACs 12, 14, and 16 use the CSMA/CA protocol when there is no traffic present from priority classes 4 to 7. Transmissions with priority classes 0 to 3 are guaranteed a minimum amount of time to transmit if traffic at those levels is present; otherwise classes 4 through 7 may occupy almost all the capacity of network 4.

Transmissions from MACs 12, 14, and 16 with priority classes 4 to 7 use periodic contention free channel access (PCF-CA) that provides periodic access to network 4 for transmissions to guarantee QoS and prevent bandwidth of network 4 from being over allocated. PCF-CA organizes contention within a given priority class (e.g., classes 4-7) for access to network 4 on a first come, first serve basis to provide guarantees of QoS to transmissions from MACs 12, 14, and 16 subject to bandwidth of network 4. Priority classes 4 to 7 require a Session Setup procedure (described below) and are subject to Admission Control (described below). Priority class 4 is can be used for applications such as network games resulting in a typical data rate of less than 1.0 mega ($10^6$) bits per second (Mbps) and QoS requirements of a latency of less than 15 milliseconds (msec). MAC Service Data Units (MSDU) or transmitted data packets for applications at priority class 4 are typically short (less than 500 octets of 8 bits each). The PLP for priority class 4 is quasi error free (QEF) meaning a PLP of $10^{-10}$ to $10^{10-11}$. Priority class 5 is used for applications such as internet video and video conferencing resulting in a typical data rate of 0.1 to 2 Mbps and QoS requirements of a latency of 75-100 msecs and a PLP of $10^{-3}$ seconds. Priority class 6 is used for applications such as high quality video and home theater audio resulting in a typical data rate of 0.3-25 Mbps with QoS requirements of a latency of 100 to 300 msecs and a jitter of 500 nano seconds. Priority class 6 has a PLP requirement of QEF meaning a PLP of $10^{-10}$ to $10^{-11}$. Priority class 7 is used for Voice over Internet Protocol (VoIP) applications resulting in a typical data rate of less than 0.064 Mbps but with QoS requirements of a latency of less than 15 msecs and a PLP of $10^{-2}$. MSDUs for applications at priority class 7 are typically short (<500 octets).

TABLE 1

Traffic Classes with Typical Parameter Values

|  |  | Class | CAP | Typical Data Rate per stream (Mbps) | MSDU (octets) | Latency (msec) | Jitter | Packet Loss Probablility (PLP) | Application Examples |
|---|---|---|---|---|---|---|---|---|---|
| Aperiodic | CSMA/CA Only | 0 | 0 | — | — | — | — | — | |
|  |  | 1 | 1 | — | — | — | — | — | |
|  |  | 2 | 2 | — | — | — | — | — | |
|  |  | 3 | 3 | — | — | — | — | — | |
| Periodic | Contention Free | 4 | 3 | <1 | short (<500) | low (<15) | N/A | Quasi Error Free (QEF) | Gaming |
|  |  | 5 | 3 | 0.1-2 | long | medium (75-100) | N/A | $10^{-3}$ | Internet Video, Video Conferencing |
|  |  | 6 | 3 | 0.3-25 | long | high 300 max 100 default | 500 ns | QEF | High quality video, audio, Home Theater Audio, etc., |
|  |  | 7 | 3 | <0.064 | short (<500) | low (<15) | N/A | $10^{-2}$ | VoIP |

Figure 2:
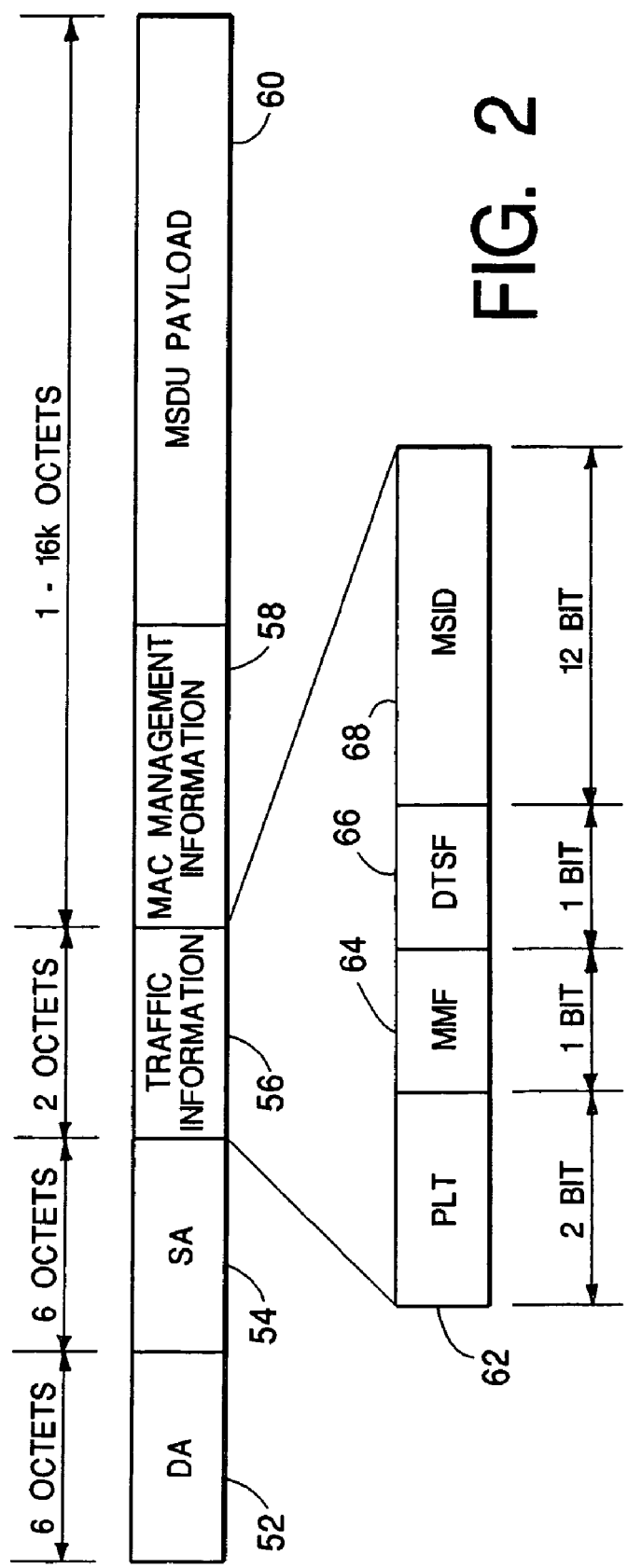
FIG. 2 is a diagram of a Media Access Controller Service Data Unit (MSDU).

Referring to FIG. 2, MSDU refers to the information payload that the MAC (e.g., 12, 14, 16)transports on network 4. Each MSDU (FIG. 2) contains a Destination Address (DA) 52, a Source Address (SA) 54, traffic information 56, MAC Management Information 58, and MSDU payload 60. The Destination Address (DA) field 52 and Source Address (SA) field 54 are 6 octets each where an octet is a sequence of eight bits) and are identical to the corresponding fields described in Institute of Electrical and Electronics Engineers (IEEE) Standard 802.3 (i.e. addresses 52 and 54 use the IEEE 48-bit MAC address format).

The 2-octet Traffic Information field 56 contains a 2-bit Protocol Adaptation Layer (PAL) Type (PLT) field 62, a 1-bit MAC Management Flag (MMF) 64, a 1-bit DTS Flag 66, and a 12 bit MAC Stream ID (MSID) field 68. These fields 62, 64, 66, and 68 are listed in Table2.

TABLE 2

MSDU Traffic Information

| Field | Length (bits) | Definition |
|---|---|---|
| PLT | 2 | PAL Type |
| MMF | 1 | MAC Management Information Flag |
| DTSF | 1 | Delivery Time Stamp Flag |
| MSID | 12 | MAC Stream Identifier |

The PAL Type (PLT) field 62 defines the protocol and other characteristics of the MSDU payload. Table 3 shows the interpretation of the PLT field 62.

TABLE 3

PAL Type

| PLT Value | Interpretation |
|---|---|
| 0b00 | Ethernet PAL |
| 0b01 | Isochronous Stream |
| 0b10 | Reserved |
| 0b11 | Reserved |

The MAC Management Flag (MMF) 64 is set to 0b1 to indicate that a particular MSDU is associated with an embedded MAC Management Information (MMI) field 58.

The Delivery Time Stamp Flag (DTSF) 66 is set to 0b1 by the PAL to indicate that the MSDU payload 60 should be associated with a Delivery Time Stamp in a Sub-Frame that may contain other MSDU payloads 60 that do not have a DTS (as indicated by a DTSF value of 0b0).

The MAC Stream ID (MSID) 68 is a 12-bit field that is associated with the payload 60 being carried by the MSDU. MSIDs 0 to 3 are used by MSDUs that carry connectionless CSMA/CA traffic at channel access priority CA0 to CA3 respectively. The remaining MSIDs may be used by connection-based services or CSMA/CA traffic, and are assigned by the MAC (e.g. 12, 14, 16) during the connection setup process.

TABLE 4

MAC Stream Identifier

| MSID Value | Interpretation |
|---|---|
| 0x000 | CA0, CSMA/CA |
| 0x001 | CA1, CSMA/CA |
| 0x002 | CA2, CSMA/CA |
| 0x003 | CA3, CSMA/CA |
| 0x004-0xfff | Negotiated Stream Ids |

The MSDU can contain MAC Management Information 58. The presence of MAC Management Information 58 field is indicated by the MMF flag 64 in the Traffic Information field 56. The MSDU Payload field 60 depends on the Protocol Adaptation Layer (PAL) in the MAC (e.g. 12, 14, 16) that generated the MSDU. The MSDU Payload 60 is not interpreted by the MACs 12, 14, or 16.

Figure 3:
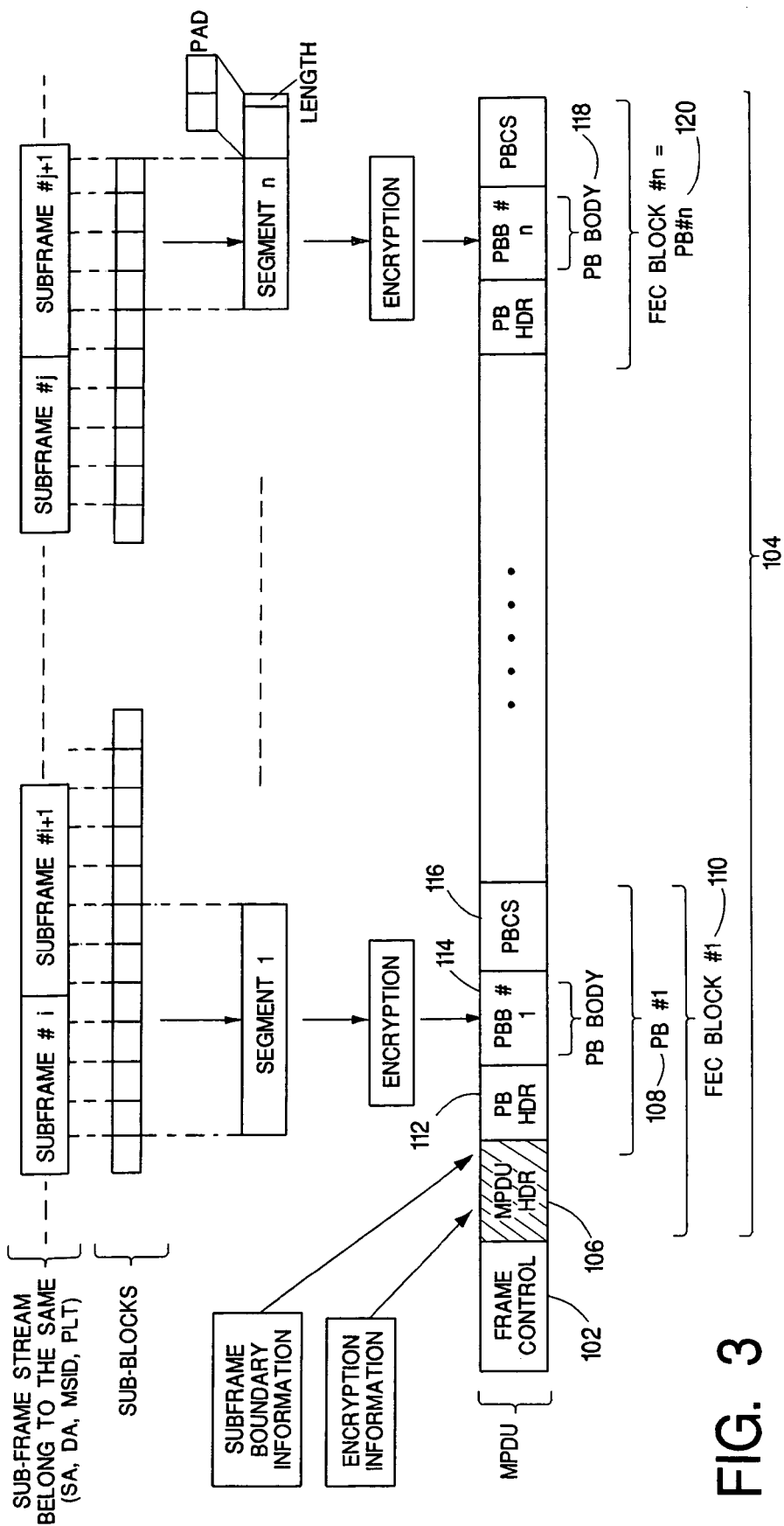
FIG. 3 is a diagram of Media Access Controller Protocol Data Unit (MPDU).

MSDUs are transmitted by MACs 12, 14, and 16 using MAC Protocol Data Units (MPDUs). FIG. 3 shows the overall format of an MPDU. The MPDU is composed of a Frame Control field 102 followed by a MPDU Payload 104 that includes a MPDU header 106 and one or more Physical Layer (PHY) Blocks (PBs) 108. PB 108 is used by the Automatic Retransmission Request (ARQ) mechanism. ARQ is a protocol for error control in data transmission. When a receiver detects an error in a packet, the receiver automatically requests the transmitter to resend the packet. This process is repeated until the packet is error free or the error continues beyond a predetermined number of transmissions. Each PB 108 has an associated PB Header 112, PB Body (PBB) 114 and a PB Check Sequence (PBCS) 116. Only the PBB 114 is subject to encryption because the PBB 114 is essentially an encrypted fixed size segment. PBBs 114 are encrypted independently of one another. The first (or only) FEC Block 110 in an MPDU Payload 104 is composed of the MPDU header 106, and the first PB 108. The subsequent (if any) FEC Blocks correspond to PB #2 to PB #n for an MPDU 100 containing n PBs. The last PBB 118 in the last FEC block 120 may not be full, and so may require padding. If the segment in the last PBB 118 is more than one octet smaller than the PBB size, then a length field comprises the last two octets of the PBB 118.

Frame Control fields 102 carry information required by the PHY to demodulate the MPDU payload 104 as well as Channel Access, ARQ, VCS, and Tone Maps information required by the MAC (e.g., 12, 14, 16).

MPDUs carry structure information that is necessary for coordinating access to the medium and for proper delivery to the intended receiver. MPDUs are also used in conveying reception status (i.e., for acknowledgment) so that the transmitter can retransmit lost MPDUs. The MPDUs typically contains a broadcast header in the form of Frame Control 102 that is received by all MACs 12, 14, and 16 in the network 4 defining the extent of the payload that is intended for the destination MAC 12, 14, or 16. Frame Control 102 information can also be used for ARQ.

Two MPDU formats are defined, a Long MPDU and a Short MPDU. The long MAC Protocol Data Unit includes a Frame Control 102 and an MPDU header 106 followed by one or more PBs 108. Long MPDUs carry application data payload. A Short MPDU consists of a Frame Control 102. These are used for MAC level acknowledgments and maintenance.

A Long MPDU is processed by the PHY into the MSDU that has a maximum length in time and varying octet capacity determined by its length and channel conditions. The MPDU header 106 and the first PB 108 are encoded in the first FEC block 110, and the subsequent PBs are each encoded in their own FEC block 110 by the PHY. A Preamble sequence is prepended to the FC 102, and two reference symbols are inserted between the FC 102 and the first FEC block 110 to form the MSDU 50, the physical entity that is transmitted over the medium. The preamble is used for synchronization at the PHY layer.

The term Delimiter is also used to refer to a physical entity consisting of a Preamble and Frame Control. The Frame Control 102 contains information used by MACs 12, 14, and 16 in the network 4 for channel access, as well as information used by the destination. For this reason, Frame Control 102 has specific physical layer encoding and modulation.

2. Periodic Contention Free Channel Access (PCF-CA)

Traffic streams with priority classes 4-7 between MACs 12, 14, and 16 that require guarantees on QoS parameters use a periodic contention free channel access (PCF-CA) mechanism that is built over the CSMA/CA protocol. Traffic Streams using PCF-CA access obtain periodic access (e.g., every 25 msec) to the medium 3. PCF-CA also provides mechanism for half period PCF-session, where certain streams can access the medium twice in a contention free period. The CSMA/CA mechanism is used by traffic with priority classes 0-3 that do not require QoS guarantees and for transfer of management information.

Periodic contention free (PCF) sessions provide QoS for traffic with priority Classes 4-7. A session is a period of time when one or more MACs 12, 14, or 16 have authorization to transmit without contention on network 4 and this session is repeated on a periodic basis. Multiple sessions concatenate with each other. The necessary information required in maintaining these sessions is carried in the Frame Control 102 and in the MAC Management information 58 (FIG. 2). Each MAC 12, 14, and 16 monitors transmissions in the network 4 to track the existence of PCF-CA sessions. If a PCF-CA session exists, each MAC 12, 14, and 16 tracks the Contention Free Period Target Start Time (CFPTST), as well as the identity (CFID), Class, average usage, average usage deviation, Constant Bit Rate (CBR) equivalent usage, and maximum first MPDU length of each session in its position in the CF period.

Figure 4:
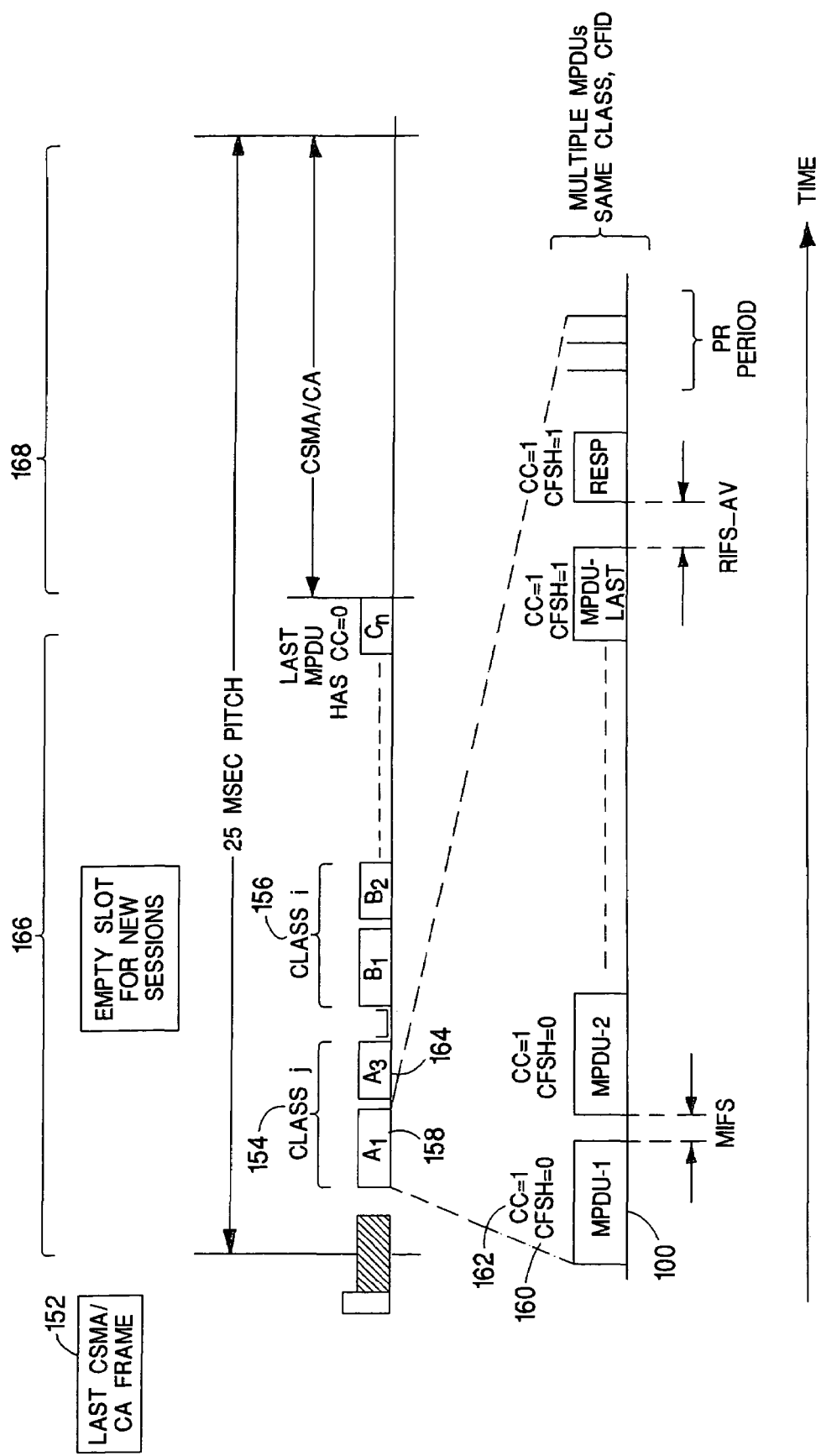
FIG. 4 is a diagram of a regularly repeated contention free communication interval and a period of CSMA/CA communication.

FIG. 4 shows a interval of message traffic on network 4 using the PCF-CA mechanism. In FIG. 4, time moves from left to right. The interval with a length of 25 msec begins with a previous CSMA/CA frame 102. The interval is divided into a contention free interval 166 and a CSMA/CA interval 168. The contention-free interval is divided into a plurality of time segments so that a plurality of data streams (sessions) A1, A3, B1, B2 can be transmitted using the contention free interval, with each data stream (session) generally assigned to one of the different time segments of successive contention-free intervals. Each session generally includes a set of MPDUs 100, as shown in the figure for session A1 (also denoted 158). The sessions are preferably grouped by priority class, with sessions A1, A3 in class 154, and sessions B1, B2 in class 156. A unique identifier (e.g., CFID) identifies each data stream (session). The number of PCF-CA sessions (e.g., 158, 164) that network 4 can support is limited only by the available bandwidth and the number of available Contention-Free Identifiers within each priority class (e.g., 154, 156).

The Frame Control (FC) 102 (FIG. 3) of each MPDU 100 carries the fields necessary for supporting the PCF-CA sessions. These include MPDU Class, Contention Free Identifier (CFID), Half Period Session Flag (HPSF), Half Period Session Handoff (HPSH), and Contention Free Session Handoff (CFSH). Additional information about the order of CF sessions within the CF period and the usage patterns for each session are also provided on an intermittent basis in the FC or by means of MAC Management Entities (MME). The {priority CLASS, CFID} is associated with a session 158 and is unique within a priority class within the network 4. The MACs 12, 14, or 16 select a CFID that is not in use for a given priority class.

Session Handoff using the CFSH flag 160 indicates the end of MPDU 100 transmission within each session 158, and passes control to the next session 164. Suspension and resumption of a session to allow half-period sessions to transmit at the mid-period mark is indicated by the HPSH flag (not shown). This suspends the normal order of sessions and allows the half-period sessions an opportunity to transmit. When a MAC Level stop and wait ARQ mechanism is used, the responses always echo the values of CFID, priority Class, CFSH 160, and HPSH of the MPDU 100 that the responses acknowledge.

To start a new PCF-CA session when there is no ongoing periodic traffic, one MAC (e.g., 12, 14, 16) contends for the medium 3 using a CSMA/CA mode and starts the periodic session 158, becoming the Contention Free Leader (CFL). Otherwise, the MAC concatenates to existing PCF-CA sessions based on the priority class 154 of the transmission from the MAC.

2.1 Periodic Contention Free Session Handoff

Multiple traffic streams between MACs 12, 14, and 16 using PCF-CA are identified by means of their priority Classes. Lower priority CSMA/CA traffic is prevented from interrupting PCF-CA traffic because Contention Free Identifier PCF sessions concatenate with each other. This concatenation is achieved by each PCF-CA session tracking other sessions in the network 4 and by broadcasting session hand over information. One of the PCF traffic sources (e.g., MAC 12, 14, or 16) acts as a contention free leader (CFL). The CFL initiates the periodic contention free channel access and provides timing information required to synchronize the start of periodic contention free sessions.

The CFL starts transmission as soon as Contention Free Period Target Start Time has been reached and after the last CSMA/CA transmission ends. The sets of MPDUs 100 from the same stream are sent consecutively with the same session identifier (CFID), a contention-free session hand-off indicator (CFSH) set to 0 until the last MPDU is sent. The last MPDU 100 is sent with the hand-off indicator (CFSH) set to 1. The response to the last MPDU 100, if present, is sent with CFSH set to 1 irrespective of the reception status of the MPDU payload 60.

When a MAC 12, 14, or 16 detects CFSH set to 1 by its predecessor, the MAC 12, 14, or 16 starts transmitting its MPDUs 100. If the predecessor is of a higher class (Class j) than the station (Class i), then the MAC 12, 14, or 16 is the Class Leader (CL) and it waits for at least contention resolution (CR) slot time before transmitting its first MPDU 100. A CR Slot time is the minimum amount of time needed to detect a previous transmission. This gap allows new streams of Class k, where i<k≦j, to join at the end of Class j.

When half period traffic is present as indicated by the Half Period Session Flag (HPSF), stations must track the half period target start time (HPTST) also. All half period sessions must be allowed to transmit both at the start of the CF Period and at the halfway mark, in order of class and age. A session 158 that is transmitting when this time is reached must suspend transmission of new MPDUs 100 and allow the half period traffic access to the medium by setting the Half Period Session Handoff (HPSH) flag. If it happens to be done with its transmissions for the current period, it will also set the CFSH flag 160. The first half period session (the Half-Period Leader, HPL) must then start transmission immediately after the Priority Resolution Period. Each half-period session will hand off control to the next half-period session in the usual way, by CFSH=0b1 on its last MPDU 100. If a half-period session has no data to send, it must send an End Of File (EOF) or a Request To Send/Clear To Send (RTS/CTS) signal to hand off control to the next session or to end the CF Period as appropriate. During the mid-period access by the half-period sessions, HPSH=0b1 for all MPDUs 100 except the last one. When the last half period session hands off to the suspended CF sessions, it will reset the HPSH flag to 0b0, to verify that it is the last half period session. At this point, the session that passed control to the half period sessions will resume transmission, if CFSH 160 was not set when it handed over control. Otherwise, its successor begins transmission in the same way it would if it had been handed access by its predecessor (i.e., respecting any required waiting period). If there is insufficient periodic traffic to occupy the medium until the HPTST, then the HPL must assert priority and contend for the medium 3 to start the second set of half period session transmissions. The HPL will do this as soon as the HPTST has arrived and after the end of any MPDU 100 that is being sent using CSMA/CA. Note that the HPL may not be the same session as the CFL, if the CFL does not require half-period access.

Traffic Classes align based on priority class during the Contention Free interval, with provisions for half period traffic to insert itself at the Contention Free half period. The actual order of contention free sessions depends on the number of traffic sources present, their priority Class and duration. For example, when there are two traffic sources with Class 6 traffic, and Class 7 traffic using half period session, the actual order of transmission can be 7-6-7-6. Note that there may also be a CSMA/CA access period before the half period traffic begins its second access, if there is insufficient contention free traffic to occupy the medium until then.

2.2 Contention-free Session Target Start Time (CFSTST) and Half Period Target Start Time (HPTST)

MACs 12, 14, or 16 can use Periodic Contention Free Virtual Carrier Sense (PCF-VCS) mechanism to enable performance in noisy environments. Each MACs 12, 14, or 16 maintains an estimate of when the Contention-Free Period is supposed to start. If there are half-period sessions present, then the Half-Period Target Start Time must also be tracked. This is done through the use of the Contention-Free Session Target Start Time (CFSTST) field broadcast using the Frame Control 102 (FIG. 3) or MAC Management Entity. CFSTST is transmitted by the CFL and gossiped by other stations in the network 4. Even if a station (e.g., 12, 14, or 16) does not currently have Contention-Free traffic, the station must maintain an estimate of the CFSTST to avoid transmission that would delay the start of the Contention-Free Period or prevent a new CF Leader (CFL) from inserting itself before the current CFL.

CFL should start the CF Period as soon after the CFSTST as possible, and after the end of the last CSMA/CA transmission. The HPTST is just half period after the CFTST. When there is insufficient CF traffic to occupy the medium until the HPTST, the Half-Period Leader (HPL) must assert priority and contend for the medium to start the second CF Period.

2.3 Contention-Free Session Order

When there is Contention-Free traffic on network 4, each MAC (e.g., 12, 14, or 16) must maintain information such as priority Class, CFID, order, usage parameters about the sessions present in order to know when the MAC may access the medium 3. Even if a MAC does not currently have Contention-Free traffic, the MAC must maintain this information in order to know when the MAC can insert a new session (e.g., 164). The order starts with the current Contention-Free Leader (CFL) and consists of the {Class, CFID} pairs of each of the sessions (e.g., 164) in the order that the MACs access the network 4 medium in the CF Period.

New sessions (e.g., 164) are added by transmission in the Contention Resolution (CR) slot that follows the last MPDU 100 and response of the last session of the same class (or the lowest class higher than the new session's class if there is no traffic of the same class present).

If a new session (e.g., 164) joins the CF period with priority higher than that of the first session, it starts transmission before the nominal start time of the CF Period and displaces the leader. All other stations can be notified of the early start using the Frame Control Information 102.

MACs (e.g. 12, 14, 16) periodically broadcast the CF Session Order information in frame control 102 or using MAC management MPDUs 100. If a session changes its location in the order due to collisions, the session should broadcast this using Frame Control 102 or MAC Management Entity as soon as possible. Any MACs detecting a change in the CF Session Order should retransmit this information as soon as practical, so that the news is disseminated quickly and completely.

A session 164 may terminate by failure or disconnection, or may terminate cleanly. When the session 164 terminates cleanly, the source MAC sends this information in frame control 102 or by means of management MPDUs 100. If a session 164 terminates due to failure or disconnection, then the other MACs on network 4 must infer that session 164 is no longer a part of the order by observing the persistent absence of session 164 from the CF Session Order. A MAC that suspects that a session (e.g., 164) is absent must indicate this using Frame Control 102 or MAC Management MPDUs 100. If a MAC 12 with a CF session observes another MAC 14 reporting its absence, MAC 12 should report its continued existence in the next CF Period. If a MAC 14 that sent absence information for a session 164 detects the continued presence of session 164, MAC 14 must send an update transmission.

The priority Class and CFID may be reused after a source MAC terminates its session 164, or after a session 164 has been determined to be terminated through the mechanism described above. If a MAC 12 starts a new CF session 164, the MAC 12 should pick an unused {priority Class, CFID} pair and insert the new session 164 at the end of its class 154. If an existing session 158 that is already using that {priority Class, CFID} pair detects a new session 164 attempting to use the same {Class, CFID} pair, the existing session 158 notifies the MAC 14 creating the new session 164. The MAC 14 receiving a MAC Management entity indicating a conflict in {priority Class, CFID}, MM Entry must check its contents to verify the positions of its CF sessions. If the MAC 14 determines that there is different session 158 using the same {priority Class, CFID} pair as it is using, MAC 14 must terminate session 164 quietly and restart it using a different {priority Class, CFID} pair.

3. Admission Control

Providing guaranteed QoS require MACs to limit the amount of traffic that is admitted into the network 4. This mechanism, commonly referred to as admission control, is done based on a predetermined maximum allocation for each priority Class (e.g., 154, 156) and the total allocation for QoS traffic. In this mechanism, a new QoS steam is allowed access to the medium network 4 only if either the maximum allocation for the priority Class or the total allocation for the QoS traffic is not exceeded. When the total allocation for the QoS traffic is exceeded, traffic streams that exceed their respective priority Class allocations are terminated on a last come first out basis with the priority Class, with traffic streams from the lowest priority Class terminated first.

Admission Control is accomplished in a distributed manner based on priority Class, and on a first come first serve basis within a priority class. Admission control can guarantee some minimum amount of access for each traffic priority Class and CSMA traffic.

3.1 Station Network Monitoring Functions

MACs 12, 14, 16 track the smoothed amount of time each of its CF sessions uses each CF period. In some implementations, usage values have a 100 microsecond resolution. The Constant Bit Rate (CBR) equivalent usage, average usage and usage average deviation values are sent periodically for each stream using the Frame Control 102 and/or MAC Management Entities. Each MAC also maintains a table with these values for each CF data stream (session), based on the broadcast information.

Each MAC also maintains the usage time per CF period of each class, based on its observations. Each MAC updates the usage time per CF period of each class only when the boundaries of the first and last sessions within a class are received. The computations are the same, as those used for tracking a MAC's own streams.

Usage values are used in admission control and for Periodic Contention-Free Virtual Carrier Sense (PCF-VCS).

3.2 Admission Control and Maintenance Rules

When a new message stream requiring QoS arrives, the source Protocol Adaptation Layer (PAL) sends a request to the source MAC to create a new CF session. The source MAC must determine that there is sufficient time available on the medium each CF period to support the request, and that the destination MAC has the resources needed for the stream. The request contains required data rate, packet loss tolerance, and latency information. The required data rate, packet loss tolerance, and latency information combine with the channel characteristics between the source and destination to arrive at an amount of time required per CF period for the new session. Data rate and latency are used to gauge the resources needed at the receiver MAC. If there are insufficient resources at the destination MAC or there is insufficient time within the CF period on the medium 3, then the source MAC denies its PAL's request. Otherwise, the source MAC starts a new session using a unused CFID, and inserts it at the end of its class in the CF session order.

Let $E_i$ be the aggregate usage per Contention Free period of existing class i sessions, and let E be the aggregate usage per Contention Free Period of all CF sessions (classes 4-7). Let $E_0$ be the existing usage of CSMA traffic per Contention Free period. The $E_i$ values should be computed as sum of the smoothed mean and the smoothed mean deviation. Alternatively, the sum of the CBR Equivalents for each session within the class may be used. Let $a_i$ be the fraction of the CF Access Interval guaranteed to class i, let $a_0$ be the excess allocation for CSMA traffic, and let $G_0$ be the guaranteed allocation per 25 ms period for CSMA traffic when it is always busy. Then $E=\Sigma E_i$, i=4,5,6,7, and $\Sigma a_i=1$, i=4,5,6,7.

Since CSMA/CA traffic may not use its guaranteed busy allocation, the current allocation $A_0$ for CSMA traffic is computed as the lesser of its guarantee and the current usage scaled by the excess allocation:

$$A_0 = \min(G_0, (1+a_0)E_0 + 0.125) \text{ ms}.$$

A minimum average time is allowed for CSMA traffic to announce its presence when it is not currently in use. Excess allocation $a_0$ is a configurable parameter, $0<a_0<1$. The allocation $A_i$ for class i in a Contention Free period is then $A_i = a_i(CFP - A_0)$, where CFP is the Contention Free Period in msec. The per-class fractional guarantees are configurable through MAC Management Entries.

The following rules are observed for PCF-CA traffic in classes 4-7 for network 4. A new stream requesting admission provides a source MAC 12 with its QoS parameters. From these, the source MAC 12 must compute an expected usage time per CF period, u. The request is granted if a destination MAC 14 accepts it and either (1) $E+u+A_0<CFP$ ms., or (2) $E_i+u<A_i$.

The first rule (1) states that if there is capacity available, then the new session can take it. The second rule (2) states that if there is guaranteed allocation available for its class, the new session can take it. In this case, some other class j that is oversubscribed (i.e., $E_j>A_j$) may have to terminate or adapt the rate of one or more of its existing sessions.

If the medium 3 is oversubscribed, then $E+A_0>CFP$ ms and one or more sessions must be terminated. Each MAC 12, 14, 16 must consider the sessions for which it is the source, and terminate them if required. The newest session in an oversubscribed class (e.g., 154, 156) must be terminated, with this process continuing until the medium is no longer oversubscribed.

4. Periodic Contention Free Virtual Carrier Sense (PCF-VCS)

Operation of PCF-CA mechanism can be improved in noisy environments where medium 3 experiences noise occasionally disrupting communications by using PCF Virtual Carrier Sense (PCF-VCS). PCF-VCS uses the knowledge of CF session order and usage to obtain reliable performance. Each MAC employs a Contention Free Virtual Carrier Sense (CF-VCS) mechanism to determine when it should start transmission of MPDUs 100 belonging to each of its CF sessions. To do this, each MAC tracks the beginning of each Contention Free Period (CFP) and the Half Period Target Start Time (HPTST), the maximum length first MPDU 100 for each PCF-CA session (e.g., 158 or 164), the contention free load for each class (e.g., 154 or 156), and the total contention free load, which are used for managing the CF sessions.

Tracking the beginning of each Contention Free Period (CFP) and the Half Period Target Start Time (HPTST) and the maximum length first MPDU 100 for each PCF-CA session (e.g., 158 or 164) is used to determine for a MAC 14 when a session 164 can start transmission if the MAC 14 desiring to start the session 164 does not observe communications from MAC 12 that normally broadcasts its predecessor session 158. Tracking the contention free load for each class (e.g., 154 or 156), and the total contention free load are used to determine when a low priority session must cease transmission to allow other higher priority traffic access to the medium 3. The PCF-VCS mechanism is used to maintain the integrity of the contention free interval under noisy channel conditions, or in cases of hidden stations, overlapping networks or when an active session is suddenly terminated (such as the MAC 12 being unplugged or disconnected from medium 3). The PCF-VCS mechanism is also used for admission control of PCF-CA traffic and timing of CSMA/CA traffic and for fairness.

For communication over an alternating current (AC) power line, the contention free intervals may be approximately periodic, and approximately synchronized with the 50 or 60 Hz power cycle (e.g., using a 25 msec period between onset of contention free intervals means that each period corresponds to three 8.33 msec half-cycles of a 60 Hz power cycle and two and half 10 msec half-cycles of a 50 Hz power cycle). Approximately synchronizing the contention free intervals to the power cycle has the advantage that channel adaptation (e.g., tone maps) tends to need less adjustment from one contention free interval to the next, as noise on the power line tends to be correlated with the phase of the power cycle.

Since some power line noise is synchronous to the power cycle, to avoid a particular session being trapped on a portion of the power cycle with high noise, the contention-free intervals may be chosen to synchronize so that each session generally occupies a different portion of a line cycle on a repeating basis (e.g., the occupied portion of the line cycle could repeatedly advance by a quarter of the power cycle). This provides two advantages for short duration traffic. First, the session will not get trapped on a portion of the line cycle that is much worse than another portion, and thus the throughput will be closer to average for the power line channel rather than worst case. Second, a better adaptation can be achieved because the transmitter/receiver pair can adapt based on transmissions to most, if not all, of the line cycle rather than only a small portion.

5. Virtual TDMA Implementation

Another implementation that incorporates some features of the invention, and which we refer to as virtual TDMA (vTDMA), is as follows.

The virtual TDMA implementation can be used in a network with a plurality of stations using a CSMA medium sharing mechanism. Virtual TDMA (vTDMA) allows any station to dynamically reserve a periodic slot, of arbitrary pitch (time separation) and duration, during which it will have exclusive access to the medium. These periodic slots allow a station to provide strict guarantees on QoS to its data stream, and to overcome hidden nodes. Multiple vTDMA sessions can be set up by stations in a distributed manner based on their knowledge of other ongoing vTDMA sessions in the network.

The operation of vTDMA can be conceptually divided into three phases.

1. vTDMA Session Setup Phase: This is the first phase. During this phase, the station takes various actions that will ensure that all other stations have knowledge of the new vTDMA session.

2. vTDMA Session Maintenance Phase: This is the second phase, and begins generally after the end of the first phase. During this phase, the station takes various actions to update all station on the ongoing vTDMA session.

3. vTDMA Session Termination Phase: This is the third and final phase. During this phase, the station takes various actions to ensure that all stations are informed of the termination of the vTDMA session.

The specific design of vTDMA can be tailored for a variety of CSMA systems. For example, the design of vTDMA might take into consideration the underlying CSMA protocol and packet formats, the network environments in which the system is intended to operate (e.g., hidden nodes, interference), and the guarantees on QoS that the station is intended to provide.

The following sections include details on each of the three vTDMA phases along with various implementation options.

5.1 vTDMA Session Setup Phase

During the vTDMA session setup phase, the station propagates the new vTDMA session information to all other stations in the network. The session setup information may include:

TABLE 5 vTDMA Session Setup Information

| | |
|---|---|
| Session ID | Unique session identifier |
| Source Address | Address of the station that initiated the session |
| Destination Address | Address of the station that is the intended receiver(s) |
| Session Start Time | Time at which the session starts |
| Session Period | Periodic interval at which the vTDMA session starts |
| Slot Length | Length of time for which the vTDMA session will have exclusive access to the channel during each session period |

This vTDMA session setup information is broadcast to all (or a plurality of) other stations by means of broadcast packets during regular CSMA access periods. Typical CSMA protocols have a packet structure with a header. This header can also be used to propagate the session setup information. Some possible approaches for this involve blasting (channel access without proper contention) or contention in the time slots during which the vTDMA session is intended to be setup.

For CSMA protocols where the amount of information that can be transmitted in the header is limited, all stations in the network can be configured to understand a fixed number of vTDMA session types (for example, a fixed period for all TDMA sessions eliminates the need for transmitting session period information).

The end result of this phase is that all nodes that could potentially interfere (i.e., cause collision) with the vTDMA session have knowledge of the new vTDMA session, and hence defer during the exclusive access slots.

5.2 vTDMA Session Maintenance Phase

During the vTDMA session maintenance phase, the station periodically broadcasts updates on the vTDMA session parameters. This provides a means to dynamically control the vTDMA session. This information can be broadcast to all stations using a broadcast packet during the regular CSMA access period or during the allocated slot. This information can also be propagated as part of the header field of the packet. The session maintenance information may include:

TABLE 6 vTDMA Session Maintenance Information

| | |
|---|---|
| Session ID | Unique Session identifier |
| Source Address | Address of the station that initiated the session |
| Destination Address | Address of the station(s) that is (are) the intended receiver(s) |
| Slot Length | Length of time for which vTDMA session will have exclusive access to the channel during each session period |
| Slot Start Time | Time at which the vTDMA slot starts |

Alternative implementations can also use a combination of broadcast packets and information in the header field to maintain the vTDMA session. For example, in scenarios where the slot length could potentially vary for each vTDMA slot, the header can be used to propagate slot length information of current and/or subsequent slots, while the other maintenance information is sent through broadcast packets.

The end result of this phase is a dynamic and uninterrupted vTDMA session with all stations in the network properly synchronized to the ongoing vTDMA session.

5.3 vTDMA Session Termination Phase

During the vTDMA session termination phase, the station notifies all other stations about the termination of the active vTDMA session. This can be accomplished by broadcast packets transmitted in the regular CSMA access period or during the allocated slots. This information can also be propagated as part of the header field of the packet. This session termination information may include:

TABLE 7 vTDMA Session Termination Information

| | |
|---|---|
| Session ID | Unique Session identifier |
| Source Address | Address of the station that initiated the session |
| Destination Address | Address of the station that is the intended receiver(s) |
| Session Termination Time | Time at which the vTDMA session ends |

Other implementations can choose to combine various vTDMA phases to provide for efficient implementation. For example, the session maintenance phase can be combined with the session termination phase, thus reducing the overhead required to propagate information.

Other implementations could reduce the overhead associated with the described vTDMA implementation. Apart from the overhead involved in propagation of session setup, maintenance and termination information, all stations may also take steps to defer from accessing the medium if their transmissions could collide with an ongoing vTDMA session. Another implementation could minimize this overhead by concatenating various vTDMA sessions into a single large contiguous (or back to back) vTDMA session.

Certain network installations in which vTDMA is required to operate can have legacy stations that do not implement vTDMA. In that situation, vTDMA can be tailored to operate in the network by a combination of graceful contention during the period slots with other deference mechanisms to prevent a legacy node from colliding with the vTDMA session. Certain network installations in which vTDMA is required to operate can have hidden stations. In that situation, vTDMA can be tailored to operate efficiency by having the vTDMA session setup, maintenance and termination information propagated (or repeated) using select stations in the network. For example, implementations can choose the designated receiver of the vTDMA transmission to repeat the information, for example in the acknowledgment transmission, thus ensuring all stations that hear the transmitter and/or the receiver from deferring during the vTDMA session.

Many other implementations of the invention other than those described above are within the invention, which is defined by the following claims. For example, although periodic contention free intervals have been used in the described implementations, other implementations could have non-periodic but regularly-repeated contention free intervals.

What is claimed is:

1. A method of operating in a network in which a plurality of stations communicate over a shared medium, comprising
    using a carrier sense multiple access (CSMA) service for ordinary communication between the plurality of stations;
    having a first station that desires to establish a first session of regularly repeated contention-free transmissions broadcast information descriptive of a regularly repeated contention-free interval and an allocation of time within the contention-free interval for the first session to the other stations, wherein the first station can be any of the plurality of stations;
    having the other stations that receive the broadcast from the first station defer from transmitting during the contention-free interval; and
    having a second station that desires to establish a second session of regularly repeated contention-free transmissions add the second session to the contention-free interval by broadcasting information descriptive of the second session taking into account the information descriptive of the first session, wherein the second station can be any of the plurality of stations.

2. The method of claim 1 further comprising distributing control over initiation and makeup of transmissions within the contention free intervals to the plurality of stations so that any of the plurality of stations can independently initiate transmission within the contention free interval.

3. The method of claim 2 further comprising distributing control over the maintenance and termination of transmissions within the contention free interval to the plurality of stations so that any of the plurality of stations can independently initiate transmission within the contention free interval.

4. The method of claim 3 wherein the plurality of stations act as peers with respect to one another in initiating, maintaining, and terminating transmissions within the contention free interval.

5. The method of claim 1 wherein in addition to the other stations that defer from transmitting during the contention-free intervals there are a plurality of legacy stations that lack the capability to defer and also communicate over the shared medium.

6. The method of claim 1 wherein the information descriptive of the first session comprises the duration of the contention-free intervals.

7. The method of claim 1 wherein the information descriptive of the first session comprises a period of the contention-free intervals.

8. The method of claim 1 wherein the information descriptive of the first session comprises the time at which the first session will begin.

9. The method of claim 1 wherein the information descriptive of the first session comprises the address or addresses of the station or stations that are the intended receivers of the data to be transmitted during the first session.

10. The method of claim 1 wherein the information descriptive of the first session comprises the address of the station that is establishing the first session.

11. The method of claim 1 wherein the method farther comprises:
    having the second station determine the timing of the second session taking into account the information descriptive of the first session;
    having the second station use the CSMA service to broadcast information descriptive of the second session to the other stations; and
    having the other stations that receive the broadcast from the second station defer from transmitting during the contention-free intervals of the first and the second sessions.

12. The method of claim 1 wherein the method further comprises having the first station transmit maintenance information during the first session.

13. The method in claim 12 wherein the maintenance information descriptive of the first session includes a revised duration for the contention-free intervals.

14. The method in claim 12 wherein the maintenance information descriptive of the first session includes the time at which the subsequent contention-free interval staffs.

15. The method of claim 1 wherein the method further comprises having the first station transmit termination information during the first session, the termination information including the time at which the first session will end.

16. The method of claim 1, further comprising having the other stations that receive the broadcast from the first station keep track of the duration, target start time, and current usage of the contention-free interval.

17. The method of claim 1, further comprising establishing the second session in response to a request with a given quality of service requirement after determining that the necessary bandwidth to meet the quality of service requirement is available.

18. A method of operating in a network in which a plurality of stations communicate over a shared medium, comprising
    providing regularly repeated contention free intervals;
    providing CSMA communication during times outside the contention free intervals; and
    distributing control over the initiation and makeup of transmissions within the contention free intervals to the plurality of stations so that any of the plurality of stations can establish a session of regularly repeated contention free transmissions within the intervals by broadcasting information descriptive of the session taking into account any previously broadcast information descriptive of any previous session established by a different station, and so that any of the plurality of stations can independently initiate a transmission within the contention free intervals.

19. The method of claim 18 further comprising distributing control over the maintenance and termination of transmissions within the contention free interval to the plurality of stations so that any of the plurality of stations can independently terminate a transmission within the contention free interval.

20. The method of claim 19 wherein the plurality of stations act as peers with respect to one another in initiating, maintaining, and terminating transmissions within the contention free interval.

21. The method of claim 1 or 18 wherein the regularly repeated contention free interval is approximately periodic.

22. The method of claim 1 or 18 wherein the contention free interval supports a plurality of transmissions, each using a different time segment within the contention free interval, so that a plurality of data streams can be transmitted using the contention free interval, with each data stream generally assigned to one of the different time segments.

23. The method of claim 22 wherein any of the plurality of stations is capable of independently inserting a further transmission into the contention free interval.

24. The method of claim 23 wherein each of the plurality of stations keeps track of the number of transmissions being supported by the contention free interval and the amount of time used by each of the transmissions, so that the station can make a determination whether the contention free interval has sufficient remaining capacity to support a further transmission by the station.

25. The method of claim 22 wherein at least one data stream is assigned to a plurality of different time segments spaced apart within the same contention free interval, thereby reducing latency for the at least one data stream.

26. The method of claim 25 wherein there are two different time segments from the same contention free interval assigned to the same data stream, with one time segment at or near the start of the interval, and the other time segment at or near the midpoint of the interval.

27. The method of claim 22 wherein each of the stations sending a transmission during the contention free interval begins transmitting in response to recognizing that the transmission immediately prior to it has concluded.

28. The method of claim 22 wherein information characterizing each of the plurality of transmissions is conveyed to substantially all of the plurality of stations.

29. The method of claim 22 wherein transmissions of different priority classes can share the contention free interval, and access to the contention free interval is given to a transmission of a higher priority class if insufficient time is available within the interval to support all transmissions seeking to use the interval.

30. The method of claim 29 wherein a transmission can be terminated if transmissions of higher priority consume enough of the contention free interval that insufficient time remains for continuing the transmission.

31. The method of claim 30 wherein the transmissions terminated are terminated following a last-in, first-out protocol.

32. The method of claim 31 wherein the transmissions terminated are terminated following a last-in, first-out protocol within the same priority class.

33. The method of claim 30 wherein a limit is set on the fraction of time within the contention free interval that may be used by transmissions of a particular priority class.

34. The method of claim 33 wherein different fractions of the contention free interval are assigned to different priority classes, so that some priority classes are allocated more of the contention free interval than other priority classes.

35. The method of claim 29 wherein the sequence of transmissions within the contention free interval is ordered by priority class, with transmissions of higher priority classes occurring earlier than transmissions of lower priority classes.

36. The method of claim 35 wherein a short time interval is provided following the last transmission of each priority class, so that a station desiring to initiate a new transmission with a particular priority class may begin the transmission during the short time interval following the last transmission of that priority class.

37. The method of claim 35 wherein a station desiring to initiate a transmission of a particular priority class will generally initiate the transmission between the last transmission of the same or higher priority class and the start of the first transmission of a lower priority class, thereby maintaining a priority order to the sequence of transmissions within the contention free interval.

38. The method of claim 37 wherein a short time interval is provided following the last transmission of each priority class, and the transmission of the particular priority class is initiated during the short time interval between the last transmission of the same or higher priority class and the start of the first transmission of a lower priority class.

39. The method of claim 29 wherein the sequence of transmissions within the contention free interval is ordered by sequence in which transmission was initiated, with earlier initiated transmissions occurring earlier than later initiated transmissions.

40. The method of claim 22 wherein each transmission is assigned a unique identifier, and the identifier is conveyed to the other stations along with information characterizing the transmission.

41. The method of claim 22 wherein the length of the contention free interval varies with demand for contention free transmissions.

42. The method of claim 1 or 18 wherein each of the stations independently follows a set of admission rules common to the plurality of stations.

43. The method of claim 1 or 18 wherein the shared medium is an alternating current (AC) power line.

44. The method of claim 43 wherein the contention free intervals are approximately synchronized to the power cycle of the AC power line.

45. The method of claims 1, 12 or 13 wherein at least a portion of the information descriptive of the first session is transmitted in one or more header fields of packets broadcast over the network.

46. The method of claims 1, 12 or 13 wherein at least a portion of the information descriptive of the first session is transmitted in the packet body of packets broadcast over the network.

47. The method of claims 1, 12 or 13 wherein at least a portion of the information descriptive of the first session is fixed ahead of time and is not included in the information descriptive of the first session.

48. The method of claims 1, 12 or 13 wherein the information descriptive of the first session is broadcast using the CSMA service.

49. The method of claims 1, 12 or 13 wherein the information descriptive of the first session is broadcast using the regularly-repeated contention-free session.

50. The method of claims 1, 12 or 13 wherein one or more stations other than the first station may propagate the session information generated by the first station.

51. A method of operating in a network in which a plurality of stations communicate over a shared medium, comprising:
using a carrier sense multiple access (CSMA) service for ordinary communication between the plurality of stations;
having a first station that desires to establish a first session of regularly repeated contention-free transmission intervals broadcast information descriptive of the first session to the other stations, wherein the first station can be any of the plurality of stations; and having the other stations that receive the broadcast from the first station defer from transmitting during the contention-free intervals of the first session, wherein the contention free interval supports a plurality of transmissions, each using a different time segment within the contention free interval, so that a plurality of data streams can be transmitted using the contention free interval, with each data stream generally assigned to one of the different time segments and wherein each of the stations sending a transmission during the contention free interval begins transmitting in response to recognizing that the transmission immediately prior to it has concluded and wherein a transmission that is concluding includes a hand-off indication near the end of its transmission, and the transmission that follows is initiated based on receipt of the hand-off indication and the identity of the transmission that is concluding.

52. A method of operating in a network in which a plurality of stations communicate over a shared medium, comprising:

using a carrier sense multiple access (CSMA) service for ordinary communication between the plurality of stations;

having a first station that desires to establish a first session of regularly repeated contention-free transmission intervals broadcast information descriptive of the first session to the other stations, wherein the first station can be any of the plurality of stations; and having the other stations that receive the broadcast from the first station defer from transmitting during the contention-free intervals of the first session, wherein the contention free interval supports a plurality of transmissions, each using a different time segment within the contention free interval, so that a plurality of data streams can be transmitted using the contention free interval, with each data stream generally assigned to one of the different time segments and wherein each station independently keeps track of the usage of the contention free interval to determine whether there is sufficient time available in the interval to support a further transmission that the station has been asked to initiate.

53. A method of operating in a network in which a plurality of stations communicate over a shared medium, comprising:

using a carrier sense multiple access (CSMA) service for ordinary communication between the plurality of stations;

having a first station that desires to establish a first session of regularly repeated contention-free transmission intervals broadcast information descriptive of the first session to the other stations, wherein the first station can be any of the plurality of stations; and having the other stations that receive the broadcast from the first station defer from transmitting during the contention-free intervals of the first session, wherein the contention free interval supports a plurality of transmissions, each using a different time segment within the contention free interval, so that a plurality of data streams can be transmitted using the contention free interval, with each data stream generally assigned to one of the different time segments and wherein the information characterizing a transmission includes information characterizing the temporal location of the transmission within the contention free interval.

54. A method of operating in a network in which a plurality of stations communicate over a shared medium, comprising:

using a carrier sense multiple access (CSMA) service for ordinary communication between the plurality of stations;

having a first station that desires to establish a first session of regularly repeated contention-free transmission intervals broadcast information descriptive of the first session to the other stations, wherein the first station can be any of the plurality of stations; and having the other stations that receive the broadcast from the first station defer from transmitting during the contention-free intervals of the first session, wherein the contention free interval supports a plurality of transmissions, each using a different time segment within the contention free interval, so that a plurality of data streams can be transmitted using the contention free interval, with each data stream generally assigned to one of the different time segments and wherein short time intervals are provided between successive transmissions within the contention free interval, so that a station desiring to initiate a new transmission may begin the transmission during one of the short time intervals, and other stations will learn that the new transmission has been inserted at that location in the contention free interval.

55. A method of operating in a network in which a plurality of stations communicate over a shared medium, comprising:

providing regularly repeated contention free intervals;

providing CSMA communication during times outside the contention free intervals; and distributing control over the initiation and makeup of the contention free intervals to the plurality of stations so that any of the plurality of stations can independently initiate a transmission within the contention free interval, wherein the contention free interval supports a plurality of transmissions, each using a different time segment within the contention free interval, so that a plurality of data streams can be transmitted using the contention free interval, with each data stream generally assigned to one of the different time segments and wherein each of the stations sending a transmission during the contention free interval begins transmitting in response to recognizing that the transmission immediately prior to it has concluded and wherein a transmission that is concluding includes a handoff indication near the end of its transmission, and the transmission that follows is initiated based on receipt of the hand-off indication and the identity of the transmission that is concluding.

56. A method of operating in a network in which a plurality of stations communicate over a shared medium, comprising:

providing regularly repeated contention free intervals;

providing CSMA communication during times outside the contention free intervals; and distributing control over the initiation and makeup of the contention free intervals to the plurality of stations so that any of the plurality of stations can independently initiate a transmission within the contention free interval, wherein the contention free interval supports a plurality of transmissions, each using a different time segment within the contention free interval, so that a plurality of data streams can be transmitted using the contention free interval, with each data stream generally assigned to one of the different time segments and wherein each station independently keeps track of the usage of the contention free interval to determine whether there is sufficient time available in the interval to support a further transmission that the station has been asked to initiate.

57. The method of claim 52 or 56 wherein the information characterizing a particular transmission is conveyed to the other stations not only by the station making the particular transmission but by one ore more of the other stations that receive the information and retransmit it to the other stations, thereby increasing the likelihood that the information will be conveyed to all stations.

58. The method of claim 52 or 56 wherein stations rely on observation of the network to independently keep track of the usage of the contention free interval to determine whether there is sufficient time available in the interval to support a further transmission that the station has been asked to initiate.

59. A method of operating in a network in which a plurality of stations communicate over a shared medium, comprising:
provdiing regularly repeated contention free intervals;
providing CSMA communication during times outside the contention free intervals; and
distributing control over the initiation and makeup of the contention free intervals to the plurality of stations so that any of the plurality of stations can independently initiate a transmission within the contention free interval, wherein the contention free interval supports a plurality of transmissions, each using a different time segment within the contention free interval, so that a plurality of data streams can be transmitted using the contention free interval, with each data stream generally assigned to one of the different time segments and wherein the information characterizing a transmission includes information characterizing the temporal location of the transmission within the contention free interval.

60. A method of operating in a network in which a plurality of stations communicate over a shared medium, comprising:
providing regularly repeated contention free intervals;
providing CSMA communication during times outside the contention free intervals; and
distributing control over the initiation and makeup of the contention free intervals to the plurality of stations so that any of the plurality of stations can independently initiate a transmission within the contention free interval, wherein the contention free interval supports a plurality of transmissions, each using a different time segment within the contention free interval, so that a plurality of data streams can be transmitted using the contention free interval, with each data stream generally assigned to one of the different time segments and wherein short time intervals are provided between successive transmissions within the contention free interval, so that a station desiring to initiate a new transmission may begin the transmission during one of the short time intervals, and other stations will learn that the new transmission has been inserted at that location in the contention free interval.

* * * * *

UNITED STATES PATENT AND TRADEMARK OFFICE
CERTIFICATE OF CORRECTION

PATENT NO. : 7,623,542 B2 Page 1 of 1
APPLICATION NO. : 10/695371
DATED : November 24, 2009
INVENTOR(S) : Lawrence W. Yonge, III It is certified that error appears in the above-identified patent and that said Letters Patent is hereby corrected as shown below:

Column 20, Line 11, In Claim 11, delete "farther" and insert -- further --

Column 20, Line 31, In Claim 14, delete "staffs." and insert -- starts --

Column 24, Line 43, In Claim 55, delete "handoff" and insert -- hand-off --

Column 25, Line 4, In Claim 57, delete "ore" and insert -- or --

Signed and Sealed this

Sixteenth Day of February, 2010

David J. Kappos
*Director of the United States Patent and Trademark Office*